United States Patent Office 3,328,489
Patented June 27, 1967

3,328,489
STABILIZED POLYOLEFIN POLYMER
COMPOSITIONS
Stanley A. Murdock, Concord, Calif., assignor to The Dow Chemical Company, Midland, Mich., a corporation of Delaware
No Drawing. Filed Mar. 15, 1963, Ser. No. 266,144
10 Claims. (Cl. 260—897)

The present invention relates to the stabilization of olefin polymer compositions against heat and oxidative deterioration by incorporating therein certain polyphenolic polymers in combination with dilaurylthiodipropionate or distearylthiodipropionate, which combination is capable of efficiently stabilizing the polymer and simultaneously capable of withstanding rather severe polymer processing conditions.

Several compounds, including certain phenolic compounds, have been found to be of value for stabilizing polyolefins such as polypropylene and copolymers of propylene with other olefins against discoloration, degradation, and embrittlement. For the most part, the stabilizer has been added to the olefin polymer while it is in molten form. The primary attendant problem of this method of incorporating the chosen stabilizer is that the molten polymer or melt is usually of high viscosity and uniform mixing is not easily nor always attained. In some instances the polymer is first obtained in solid form and must then be heated to a molten state to incorporate the stabilizer.

When solution polymerization of the olefin monomer is employed, one of the last processing steps is the recovery of the polymer in molten condition by evaporation of the solvent. Conveniently, the addition of the stabilizer is at this final stage while the polymer is in the molten state. However, as indicated, obtaining a uniform distribution of stabilizer throughout the polymer composition is not without difficulty, and furthermore, the energy requirements for the mixing are considerable.

It has now been found that it is entirely operable with excellent results to incorporate the stabilizer in the solution of polymer in solvent prior to evaporating, devolatilizing or otherwise removal of the solvent from the polymer. An excellent homogeneous blend of polymer and stabilizer is thus obtained, and blending with a high viscosity system is obviated. Unfortunately, the conventional stabilizers suited to the purpose of stabilizing such polymers are partially and sometimes essentially completely removed during the solvent removal step. For instance, one method used to remove the solvent is to pass the solution through a series of shell and tube devolatilizers which operate at temperatures in the range of 200–300° C. at 1 mm. mercury vacuum. Frequently the solution will be under these conditions for 8–10 hours. Under these severe conditions the stabilizer tends to be carried off with the solvent, or, as frequently happens, the stabilizer begins to break down or decompose. It has been found presently to be of additional advantage to incorporate a suitable stabilizer system in the polymer prior to devolatilization in that it provides an efficient means for closely controlling the molecular weight of the resulting polymer.

Accordingly, it is the chief concern and primary object of the present invention to provide highly effective stabilizers for olefin polymer compositions which will remain in and be compatible with the polymer compositions under conditions of high temperature and high vacuum.

It is a further object of the invention to provide stabilizer olefin polymer compositions.

It is still further object of the invention to provide a means for efficiently and uniformly incorporating highly effective stabilizers into an olefin polymer composition.

These as well as other objects and the attendant benefits and advantages are accomplished in accordance with the present invention which comprises incorporating in a 2 to about 8 carbon-atom aliphatic olefin polymer from about 0.05 to about 0.5 weight percent, based on olefin polymer weight, of a certain variety of a polyphenolic polymer or condensate, as hereinafter more fully delineated, and from about 0.1 to about 0.5 weight percent of dilaurylthiodipropionate (DLTDP) or distearylthiodipropionate (DSTDP), based on polymer weight.

While each of the polyphenolic polymer and the DLTDP or DSTDP individually may have stabilizing effects on the olefin polymer, surprisingly superior and far more desirable results are obtained when a combination of the polyphenolic polymer with either or both of the DLTDP or DSTDP is employed. Thus, one aspect of the present invention is the finding that the polyphenolic polymer and the DLTDP or DSTDP when used in combination apparently exert a synergistic effect regards their ability to efficiently stabilize the olefin polymer.

The polyphenolic polymer stabilizers are remarkably compatible with the olefin polymer compositions and once incorporated therein remain in a generally permanent manner throughout normal usages and exposure as well as rather severe usages, exposure and processing treatments. The olefin polymer compositions containing the stabilizers are excellently enhanced in resistance to becoming discolored and embrittled by heat and oxidative deterioration. The stabilized polymer compositions can withstand, to an unusual degree, lengths exposure to elevated temperatures in the presence of air without showing any degradive effects. This, obviously, greatly broadens and extends the field of application and utility of these polymer compositions.

The polyphenolic polymer stabilizers are, for the most part, solids at room temperature and may be incorporated in a polymer melt in the conventional fashion by blending the stabilizer in finely divided form with the melt, or by first blending the stabilizer with a small portion of the melt prior to blending that with the main batch.

As indicated, the stabilizers employed in the present invention are advantageously adapted to be added to a solution of the polymer whereby the stabilizer becomes incorporated in the polymer upon removal of the solvent. With this technique, beneficially, the stabilizer is first dissolved or dispersed in a solvent, preferably the same solvent as that in which the polymer is dissolved, and then the stabilizer solution is added to the polymer solution. Although it is possible to add the stabilizer at any solution concentration, profitably, the stabilizer solution is admixed with the polymer solution at the most dilute stage of the polymer solution processing to facilitate mixing and to promote uniform stabilizer distribution.

The polyphenolic polymer stabilizers that are so advantageously employed in the olefin polymer compositions in the practice of the present invention may be characterized as being relatively low molecular weight polymers that contain a high proportion of phenolic hydroxy groups to phenyl units in their molecules and wherein each hydroxy group is free from steric hindrance, especially by groups in the ortho position of the phenolic rings. The maximum size of the polyphonolic polymers that may be employed is somewhat limited by their solubility characteristics in solvents that are mutually solvating for the olefin polymer and the polyphenolic polymer. As indicated, it is preferable to add a solution of the stabilizer to a polymer solution. However, complete solubility of the polyphenolic polymer stabilizer is not essential so long as it is capable of being solubilized with suitable dispersing agents, or to remain in finely divided emulsions, dispersion, or stable suspension in the solvent for the olefin polymer or in a solvent compatible and miscible with the polymer solution.

The solvent-soluble polyphenolic polymer stabilizers are comprised of, or consist of, molecules containing a plurality of aromatic nuclei derived from such phenolic monomers as are selected from the group consisting of phenol, Bisphenol-A (p,p'-isopropylidene diphenol), Bisphenol-B (p,p'-sec-butylidene diphenol), bisphenol sulfone (p(p'-sulfonyldiphenol), bisphenol sulfoxide (p,p'-sulfinyldiphenol) and mixtures thereof that are condensed or linked together by about equimolar quantities of bridging agents selected from the group consisting of methylene, ethylene, and ethylidene radicals, isopropylene radicals, bivalent radicals from divinyl-benzene, bivalent radicals from isopropenyl phenols, and mixtures thereof. Alternatively, and with equal advantage, certain of the polyphenolic polymer stabilizers within the scope of the invention can be provided by using such double functional monomers as vinyl isopropenyl phenols to obtain products of self-reaction.

The linkages between the aromatic nuclei of the polyphenolic polymers (such as the methylene linkages to phenol rings) may be either ortho or para, or both ortho, with respect to the phenyl hydroxy group attached to the aromatic nucleus. As indicated, the linkages between the condensed or polymerized phenolic monomer units may be of mixed sorts in the finally obtained polymer chain. Bisphenol monomers that are linked together to form the polyphenolic polymers stabilizing agents may be linked in the polymer structure from the same phenyl group, or they may have individual links or bridging units attached to separate phenyl groups in the linked aromatic nucleus. Vinyl and isopropenyl derived linkages may have either one or two carbons between linked aromatic nuclei, each with or without side chains.

While the polyphenolic polymer stabilizers must have the above indicated solubility characteristics and the hereinafter defined arrangement of hydroxyl groups per interconnected aromatic nucleus in their structure, such characteristics cannot positively and absolutely be correlated or limited by maximum molecular weights of the diverse varieties of polyphenolic polymers that may be employed. In general, the molecular weight of the polyphenolic polymer must be at least about 300. However it may be as high as 2000 or more. An advantageous range of molecular weight for the polyphenolic polymers that are utilized is between about 400 and 1000. The polymers are insoluble in water but soluble in dulute alkali, alcohols, ketones and most other polar solvents.

Ordinarily, optimum results and greatest advantages are achieved for the polyphenolic polymers when they contain about one phenolic hydroxyl unit per single phenyl group or other aromatic nucleus in their structure. In polyphenolic polymers that have less than one hydroxyl group per single phenyl group, it is desirable for a high ratio of hydroxyl groups to inter-connected aromatic nuclei to be obtained in the polymer, such as a ratio of at least about 0.5 and up to 2.0 but preferably about 1.0 phenolic hydroxyl groups per aromatic nucleus or phenyl ring in the structure. As is apparent, it is necessary for the polyphenolic polymers to contain hydroxyl groups on conjugated ring systems. Alkoxy substituents on phenyl groups are not operative nor do they provide the desired capabilities for the stabilizers used in the practice of the present invention. Neither are hydroxy cyclohexyl or the like units.

As mentioned, at least one ring position ortho to the phenyl hydroxyl must be left unoccupied in the polyphenolic polymer stabilizers. The stabilizing activity of polyphenolic polymers having substitutions ortho to the phenolic hydroxyl units is generally found to be decreased to an undesirable, and not reliably useful, extent. Polyphenolic polymers of the same general type as above described which have double ortho substitutions adjacent to the phenolic hydroxyl units ordinarily are found to be entirely hindered for purposes of the present invention. Their activity with respect to their capability of imparting oxidative deterioration resistance to the propylene polymer is found to be significantly if not completely suppressed.

While they are neither comprehensive nor intended to depict all possibilities, the following structural formulae are illustrative of general type of polyphenolic polymer structures that may be utilized with great advantage as stabilizers in the practice of the present invention.

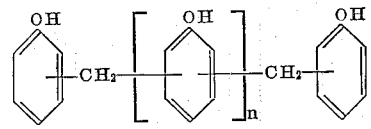

(Phenol-formaldehyde (novolaks))

wherein $n$ is an integer having an average value of one or more (and either ortho- or para-attachments, or both, may be present in the ring);

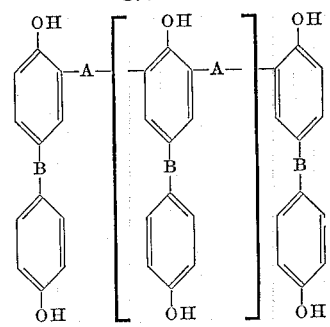

(Bisphenol-alkylidene polymers)

wherein A is a bridging or linking unit selected from the group consisting of methylene ($-CH_2-$), ethylene ($-CH_2CH_2-$), ethylidene ($-CHCH_3-$), isopropylene ($-CHCH_3CH_2-$), and the like; B is isopropylidene ($-C(CH_3)_2-$), sulfonyl ($-SO_2-$), sulfinyl ($-SO-$) and the like; and $n$ is one or more;

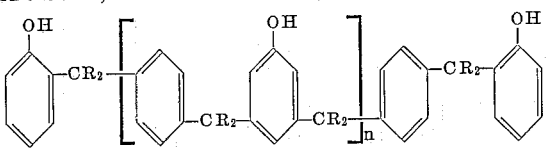

(Phenol-divinylbenzene or phenol-diisopropenylbenzene derivatives)

wherein each R is independently selected from the group consisting of hydrogen and methyl radicals with the limitation that not more than one R in any linkage may be hydrogen and $n$ is one or more and

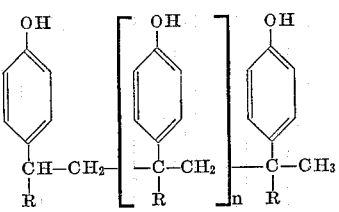

(Vinyl phenol or isopropenyl phenol homopolymers)

wherein R is selected from the group consisting of hydrogen and methyl radicals and $n$ is one or more.

As hereinbefore indicated, a significantly more than additive effect of the individual effects of the polyphenolic polymer and the DLTDP or DSTDP on the level of stabilization of the olefin polymer is obtained when the two are used in combination. Thus, in some instances, particular species of the polyphenolic polymers under certain conditions may show but very little stabilizing ability, but when combined with the DLTDP or DSTDP outstanding and highly acceptable results are obtained, and conversely, when DLTDP or DSTDP is used under certain conditions in the absence of the polyphenolic polymer. In all cases, the stabilizing effects of the two combined is more than additive.

The amount of the stabilizer system that is employed in the polymer compositions in accordance with the present invention is advantageously from about 0.05 to about 0.5 weight percent of the polyphenolic polymer, based on polymer weight, and from about 0.1 to about 0.5 weight percent of DLTDP or DSTDP, based on polymer weight. Beneficially, from between 0.1 to about 0.3 weight percent of the polyphenolic polymer and from about 0.2 to about 0.4 weight percent of DLTDP or DSTDP, both based on polymer weight, are utilized and preferably, about 0.1 weight percent of the polyphenolic polymer is used in combination with about 0.25 weight percent of DLTDP or DSTDP.

The olefin polymers that are treated in accordance with the invention are advantageously polymerized 2 to about 8 carbon-atom aliphatic olefins including both mono- and diolefins, such as ethylene, propylene, butylene and butadiene (including polymerizable mixtures thereof) and particularly 1-olefins, which are so-designated because of their terminally unsaturated configuration.

In a preferred embodiment of the invention, the polymers stablized according to the present teaching are the polyolefin polymers prepared by polymerization of monoolefinic aliphatic olefin monomers, such as ethylene, propylene, butylene and so forth (including polymerizable mixtures thereof) that contain from 2 to about 8 carbon-atoms. These polymers of ethylene, propylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV-B, V-B and VI-B metals of the Periodic System; chromium oxide on silicated alumina; hexavalent molybdenum compounds; and charcoal supported nickel-cobalt. These polymers are frequently obtained in solution by polymerizing the monoolefins in an inert solvent, preferably a hydrocarbon solvent, which may suitably be a 3 to 12 carbon atom paraffinic or aromatic hydrocarbon solvent, such as hexane, cyclohexane, and advantageously benzene, toluene and xylene.

A particular aspect of the invention is to effectively and efficiently stabilize propylene polymers, that is, homopolymeric polypropylene and copolymers of propylene and another 2 to 8 carbon olefin as described hereinabove. Preferably, the propylene polymer contains at least about 80 weight percent polymerized propylene in the polymer molecule.

The following examples are intended to further illustrate, but by no means limit, the present invention, wherein, unless otherwise indicated, all parts and percentages are by weight.

Example 1

A solution of propylene polymer comprising about 10 percent polymer solids in xylene was introduced into a devolatilizer feed tank. Into the same tank a xylene or acetone-xylene solution of a diisopropenyl benzene-phenol resin having a molecular weight of about 847 and DLTDP was metered with the aid of a Lapp micro-feeder pump in an amount so as to provide about 0.1 percent of diisopropenyl benzene-phenol resin and about 0.25 percent DLTDP, based on the weight of the polymer. The tank was agitated to insure uniform stabilizer distribution. The solution was fed from the tank to the first of two shell and tube devolatizers which operated above about 240–245° C. and atmospheric pressure. From there it was forwarded to the second stage devolatizer which was maintained at 245–250° C. and about 1 mm. Hg vacuum. The total time the solution was in the devolatilizers was about 6 hours. Polymer was recovered being essentially completely free of any residual solvent.

The stability of the polymer was evaluated by maintaining a sample of the polymer in an air oven at 140° C. and observing the time (hours) it took for a break (darkening) in color to appear.

The heat fabrication stability, of the polymer i.e., the ability of the polymer to be fabricated with heat fabricated techniques, was determined by measuring the melt index of the polymer before and after heating at 270° C. for 20 minutes. The ratio of the melt index after heating to the melt index before heating indicates fabrication stability. The lower the ratio the greater the ability of the polymer to withstand heat fabrication without reduction of molecular weight or "cracking" of the polymer.

The effectiveness of the stabilizer to reduce molecular weight loss of the polymer through the devolatilizers was also determined by measuring the molecular weight of the polymer before (feed) and after (product) it was passed through the devolatilizers. The higher the value of the ratio of the product molecular weight to the feed molecular weight the less the loss in polymer molecular weight during devolatilization.

The preceding procedure was followed excepting in one case to eliminate the addition of the diisopropenyl benzene-phenol resin, in another case to eliminate addition of the DLTDP, and in yet another case to eliminate addition of any stabilizer.

The results of the foregoing are set forth in Table I.

TABLE I

| Sample No. | Polymer Composition (Wt. Percent Based on Polymer Weight) | Weight Percent Diisopropenyl benzenephenol (Based on Polymer Wt.) | Weight Percent DLTDP (Based on Polymer Wt.) | Hours to Break at 140° C. | Fabrication Stability Ratio | Ratio M.W. Product/Feed |
|---|---|---|---|---|---|---|
| 1 | 98% Propylene/2% Ethylene | 0.1 | 0.25 | 1,320 | 2.5 | 0.91 |
| 2 | 100% Polypropylene | 0.1 | 0.25 | 904 | 2.5 | ca. 0.90 |
| 3 | do | 0.1 | 0.25 | 762 | | |
| 4 | do | 0.1 | 0.25 | 900 | | |
| 5 | do | 0.1 | None | 45 | | |
| 6 | do | None | 0.25 | 100 | | |
| 7 | do | None | None | <24 | >6 | 0.70 |

Example 2

Following the same procedure as in Example 1 excepting to employ a divinyl benzene-phenol resin having a molecular weight of about 766 in place of the diisopropenyl benzene-phenol resin, a period of 520 hours lapsed before a break was observed while exposing a sample of the polymer in an air oven at 140° C.

Example 3

The procedure of Example 1 is repeated except to substitute a Bisphenol-A-formaldehyde resin having an average molecular weight of about 500 as the polyphenolic polymer stabilizer. Essentially the same excellent results are obtained.

In contrast, when Bisphenol A was employed in place of the diisopropenyl benzene-phenol or divinyl benzene-phenol resins, a break was observed at 144 hours exposure in the air oven at 140° C.

Example 4

The procedure of Example 1 is again repeated, excepting to employ for the polyphenolic polymer stabilizer a Bisphenol-A-diisopropenyl benzene resin having an average molecular weight of about 1000. Essentially identical excellent results are obtained.

Example 5

The procedure of Example 1 is yet again repeated excepting to employ as the polyphenolic polymer stabilizer a condensation product of Bisphenol-A with divinyl benzene having an average molecular weight of about 1000. Essentially the same excellent results are obtained.

Example 6

The procedure of Example 1 is repeated except to employ a vinyl phenol resin having an average molecular weight of about 1000 as the polyphenolic polymer stabilizer. Essentially the same excellent results are obtained.

Example 7

The procedures of Examples 1-6 are repeated except that in each case where DLTDP is employed DSTDP is used in its place with similar excellent results.

Similar excellent results are obtained when other of the polyphenolic polymers and other of the olefin polymers are employed in accordance with the practice of the invention.

Other modifications and alterations will be apparent to those skilled in the art and can be entered into without departing from the intended spirit and scope of the hereindescribed invention, which, is to be interpreted by the hereto appended claims.

What is claimed is:

1. The method of preparing a stabilized olefin polymer which is also stable against molecular weight degradation when solvent is removed therefrom at elevated temperatures which comprises admixing with a solution of a 2 to 8 carbon-atom aliphatic olefin polymer dissolved in a solvent for said polymer from about 0.05 to about 0.5 weight percent of a polyphenolic condensation polymer, based on olefin polymer weight, containing phenolic units selected from the group consisting of phenol, p,p'-isopropylidene diphenol, p,p'-sec-butylidene diphenol, bisphenolsulfone, bisphenolsulfoxide, and mixtures thereof that are linked with less than equimolar quantities of bridging agents selected from the group consisting of methylene radicals, ethylene radicals, ethylidene radicals, isopropylene radicals, bivalent radicals from divinyl benzene, bivalent radicals from diisopropenyl benzene, bivalent radicals from isopropenyl phenols, and mixtures thereof, said polyphenolic polymer having a molecular weight of between about 300 and 2000 and containing between about 0.5 and 2 phenolic hydroxyl units per phenyl unit in their molecules; and, from about 0.1 to about 0.5 weight percent, based on olefin polymer weight, of a thiodipropionate selected from the group consisting of dilaurylthiodipropionate and distearylthiodipropionate; heating the solution to evaporate said solvent therefrom; and subsequently recovering said polymer.

2. The method of claim 1, wherein between about 0.1 and 0.3 weight percent of said polyphenolic polymer and between about 0.2 and about 0.4 weight percent of said thiodipropionate, both weights based on olefin polymer weight, are admixed with the polymer solution.

3. The method of claim 2, wherein said thiodipropionate is dilaurylthiodipropionate.

4. The method of claim 1, wherein said olefin polymer is a polymer of a mono-olefinic monomer.

5. The method of claim 4, wherein said polymer is a propylene polymer.

6. The method of claim 5, wherein said propylene polymer is polypropylene.

7. The method of claim 5, wherein said propylene polymer is a copolymer of propylene and ethylene.

8. The method of claim 1, wherein said polyphenolic polymer is a condensation product of diisopropenyl benzene and phenol.

9. The method of claim 1, wherein said polyphenolic polymer is a condensation product of divinyl benzene and phenol.

10. The method of claim 1, wherein said polyphenolic polymer and said thiodipropionate are dissolved in a solvent miscible with said solvent for said olefin polymer.

References Cited

UNITED STATES PATENTS

| | | | |
|---|---|---|---|
| 2,224,837 | 12/1940 | Rosenthal et al. | 260—62 |
| 3,004,953 | 10/1961 | Sonnabend | 260—62 |
| 3,124,555 | 3/1964 | Bown et al. | 260—897 |
| 3,190,852 | 6/1965 | Doyle | 260—45.85 |
| 3,227,676 | 1/1966 | Mills et al. | 260—45.85 |
| 3,243,408 | 3/1966 | Donoian et al. | 260—45.85 |

MURRAY TILLMAN, *Primary Examiner.*

T. G. FIELD, Jr., E. B. WOODRUFF,
*Assistant Examiners.*